United States Patent
Yi et al.

(10) Patent No.: US 12,287,846 B2
(45) Date of Patent: Apr. 29, 2025

(54) CODE SEQUENCE BASED INTELLIGENT KEY CODE IDENTIFICATION METHOD AND RECORDING MEDIUM AND DEVICE FOR PERFORMING THE SAME

(71) Applicant: Foundation of Soongsil University-Industry Cooperation, Seoul (KR)

(72) Inventors: Jeong Hyun Yi, Seoul (KR); Yeong Hun Ban, Incheon (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 1038 days.

(21) Appl. No.: 17/288,969

(22) PCT Filed: Jan. 28, 2021

(86) PCT No.: PCT/KR2021/001123
§ 371 (c)(1),
(2) Date: Apr. 27, 2021

(87) PCT Pub. No.: WO2022/139063
PCT Pub. Date: Jun. 30, 2022

(65) Prior Publication Data
US 2022/0207296 A1 Jun. 30, 2022

(30) Foreign Application Priority Data
Dec. 24, 2020 (KR) .................. 10-2020-0182736

(51) Int. Cl.
*G06F 18/214* (2023.01)
*G06F 21/56* (2013.01)
*G06N 20/00* (2019.01)

(52) U.S. Cl.
CPC .......... *G06F 18/214* (2023.01); *G06F 21/563* (2013.01); *G06N 20/00* (2019.01); *G06F 2221/033* (2013.01)

(58) Field of Classification Search
CPC ................. G06F 18/214; G06F 21/563; G06F 2221/033; G06N 20/00
(Continued)

(56) References Cited

U.S. PATENT DOCUMENTS 11,507,655 B1 * 11/2022 Ketireddy ................. G06F 8/70
2015/0242636 A1 8/2015 Khan et al.
(Continued)

FOREIGN PATENT DOCUMENTS

KR 10-1477050 B1 1/2015
KR 10-1557455 B1 10/2015
(Continued)

OTHER PUBLICATIONS

Le, et al., "Deep learning for source code modeling and generation: Models, Applications, and Challenges", ACM Computing Surveys, vol. 53, No. 3, Article 62, Jun. 2020 (Year: 2020).*
(Continued)

*Primary Examiner* — Tsu-Chang Lee
(74) *Attorney, Agent, or Firm* — Stein IP, LLC (57) ABSTRACT

A code sequence based intelligent key code identification method includes extracting Smali code sequence by decompiling an application, vectorizing the extracted Smali code sequence to construct a training dataset, training a deep learning model with the vectorized Smali code sequence to generate a classifier, generating a category classification result using Smali code sequence of a target application as input of the classifier, and identifying and providing important Smali code sequence from which the classification result of the target application is derived. Accordingly, it is (Continued)

possible to objectively evaluate the application using Smali code sequence of the application being actually run.

11 Claims, 3 Drawing Sheets

(58) Field of Classification Search
USPC .......................................................... 706/45
See application file for complete search history.

(56) References Cited

U.S. PATENT DOCUMENTS

| | | |
|---|---|---|
| 2018/0225553 A1 | 8/2018 | Ha et al. |
| 2019/0056922 A1 | 2/2019 | Cooper et al. |
| 2021/0141863 A1* | 5/2021 | Wu .......................... G06N 3/08 |

FOREIGN PATENT DOCUMENTS

| | | |
|---|---|---|
| KR | 10-2016-0031589 A | 3/2016 |
| KR | 10-2016-0082644 A | 7/2016 |
| KR | 10-2020-0096766 A | 8/2020 |
| KR | 10-2144044 B1 | 8/2020 |

OTHER PUBLICATIONS

Allamanis, et al., "A survey of machine learning for big bod and naturalness", ACM Computing Surveys, vol. 51, No. 4, Article 81, Jul. 2018 (Year: 2018).*

Robin Andrew Nix. "Applying Deep Learning Techniques to the Analysis of Android APKs". Louisiana State University, LSU Digital Commons (LSU Master's Theses), 2016.

Marco Tulio Ribeiro et al. "Why Should I Trust You? Explaining the Predictions of Any Classifier", Aug. 2016 (ISBN 978-1-4503-4232-2).

* cited by examiner

CODE SEQUENCE BASED INTELLIGENT KEY CODE IDENTIFICATION METHOD AND RECORDING MEDIUM AND DEVICE FOR PERFORMING THE SAME

TECHNICAL FIELD

The present disclosure relates to a code sequence based intelligent key code identification method and a recording medium and a device for performing the same, and more particularly, to technology that objectively evaluates an application using Smali code sequence based on source code of the application being actually run.

BACKGROUND ART

Most of application evaluation techniques are performed based on permission, description, and user review. The permission and description are requested and written in a developer's subjective point of view, and thus are less objective and it is difficult to expect accurate evaluation.

Additionally, in the case of permission, when the developer who does not accurately understand the meaning and influence of the corresponding permission requests the permission too much, in many cases, it greatly affects evaluation irrespective of the actual execution of the application.

The user review is also written in a user's subjective points of view, and thus is less objective, and the existing techniques do not accurately reflect the actual execution of the application.

Recently, there have emerged evaluation methods based on application programming interface (API) responsible for the actual execution of applications, but deep learning and machine learning used are relatively simple and cannot identify the actual usage relationship of API, failing to effectively use the features of API in the evaluation.

Additionally, when classifying applications, applications can be only simply classified into benign applications or malicious applications.

RELATED LITERATURES

Patent Literatures (Patent Literature 1) KR 10-2020-0096766 A
(Patent Literature 2) KR 10-2144044 B1
(Patent Literature 3) KR 10-1477050 B1

DISCLOSURE

Technical Problem

In view of this circumstance, the present disclosure is directed to providing a code sequence based intelligent key code identification method.

The present disclosure is further directed to providing a recording medium having recorded thereon a computer program for performing the code sequence based intelligent key code identification method.

The present disclosure is further directed to providing a device for performing the code sequence based intelligent key code identification method.

Technical Solution

A code sequence based intelligent key code identification method according to an embodiment for achieving the above-described object of the present disclosure includes extracting Smali code sequence by decompiling an application, vectorizing the extracted Smali code sequence to construct a training dataset, training a deep learning model with the vectorized Smali code sequence to generate a classifier, generating a category classification result using Smali code sequence of a target application as input of the classifier, and identifying and providing important Smali code sequence from which the classification result of the target application is derived.

In an embodiment of the present disclosure, constructing the training dataset may include constructing the training dataset using all the extracted Smali code sequences, and vectorizing the training dataset to use as input of the deep learning model.

In an embodiment of the present disclosure, extracting the Smali code sequence may include extracting Smali code by decompiling the application for each category, and converting the Smali code to Smali code sequence.

In an embodiment of the present disclosure, generating the category classification result may include classifying as a category having a highest probability among categories that will be classified for the target application.

In an embodiment of the present disclosure, identifying and providing the important Smali code sequence may use Local Interpretable Model-Agnostic Explanation (LIME) which is an algorithm that provides description of the deep learning model.

A computer-readable storage medium according to an embodiment for achieving another object of the present disclosure described above has recorded thereon a computer program for performing the code sequence based intelligent key code identification method.

A code sequence based intelligent key code identification device according to an embodiment for achieving still another object of the present disclosure described above includes a sequence extraction unit to extract Smali code sequence by decompiling an application, a vectorization unit to vectorize the extracted Smali code sequence to construct a training dataset, a learning unit to train a deep learning model with the vectorized Smali code sequence to generate a classifier, a classification unit to generate a category classification result using Smali code sequence of a target application as input of the classifier, and an identification unit to identify and provide important Smali code sequence from which the classification result of the target application is derived.

In an embodiment of the present disclosure, the vectorization unit may include a dataset generation unit to construct the training dataset using all the extracted Smali code sequences, and an embedding unit to vectorize the training dataset to use as input of the deep learning model.

In an embodiment of the present disclosure, the sequence extraction unit may include a Smali code unit to extract Smali code by decompiling the application for each category, and a Smali sequence conversion unit to convert the Smali code to Smali code sequence.

In an embodiment of the present disclosure, the classification unit may classify as a category having a highest probability among categories that will be classified for the target application.

In an embodiment of the present disclosure, the identification unit may use Local Interpretable Model-Agnostic Explanation (LIME) which is an algorithm that provides description of the deep learning model.

Advantageous Effects

According to the code sequence based intelligent key code identification method, since Smali code based on source code of an application being actually run is extracted and converted to Smali code sequence, the actual execution flow of the application is identified, and important Smali code sequence of the application is identified along with classifying the category of the application using a deep learning model. Accordingly, security is strengthened by identifying important Smali code sequence based on the actual execution, so it is expected to prevent damage caused by malicious behavior.

BEST MODE

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be embodied in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

Hereinafter, the preferred embodiments of the present disclosure will be described in more detail with reference to the accompanying drawings.

Figure 1:
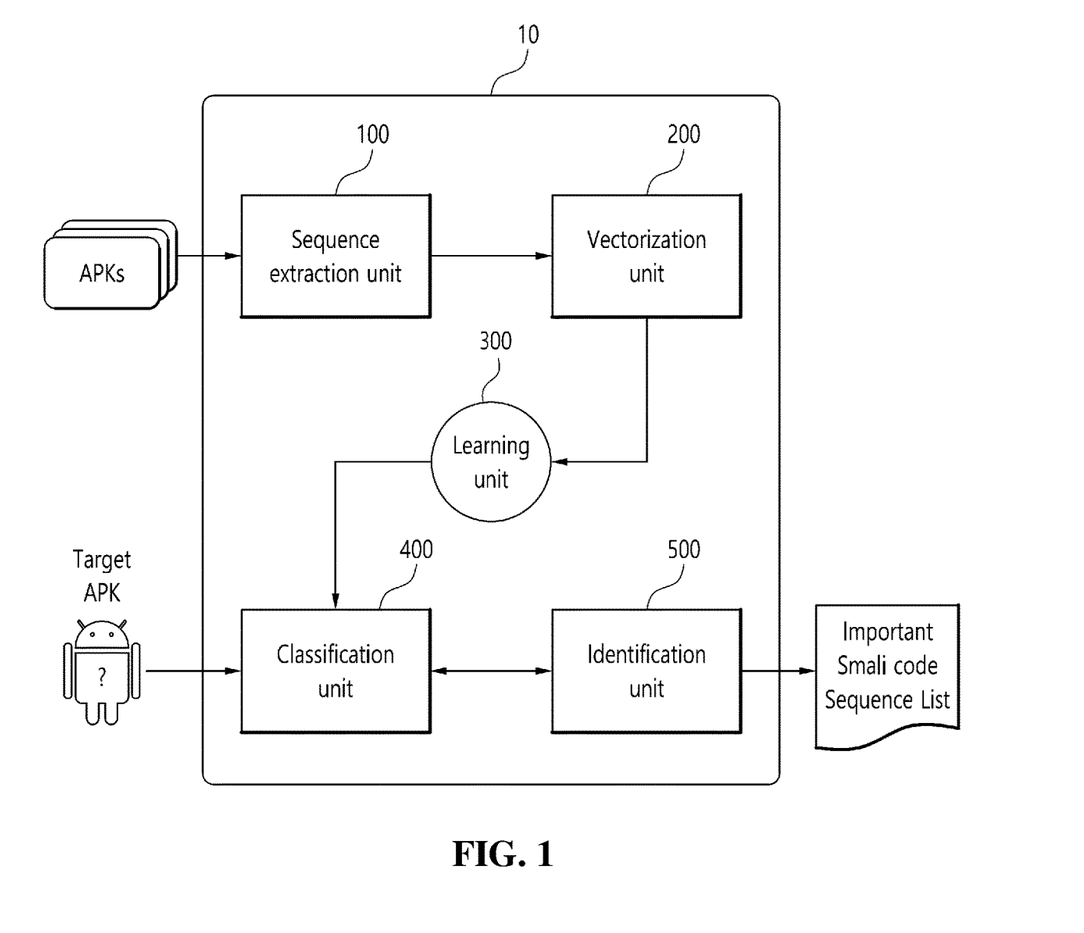
FIG. 1 is a block diagram of a code sequence based intelligent key code identification device according to an embodiment of the present disclosure.

FIG. 1 is a block diagram of a code sequence based intelligent key code identification device according to an embodiment of the present disclosure.

The code sequence based intelligent key code identification device 10 according to the present disclosure (hereinafter, the device) evaluates an application by identifying important Smali code sequence of the application based on Smali code of the application. Since Smali code is based on source code of the application being actually run, when Smali code sequence converted from Smali code is used, the actual execution flow of the application is reflected, which makes it possible to objectively evaluate the application.

Referring to FIG. 1, the device 10 according to the present disclosure includes a sequence extraction unit 100, a vectorization unit 200, a learning unit 300, a classification unit 400 and an identification unit 500.

The device 10 of the present disclosure may run software (application) for performing code sequence based intelligent key code identification thereon, and the sequence extraction unit 100, the vectorization unit 200, the learning unit 300, the classification unit 400 and the identification unit 500 may be controlled by the software for performing the code sequence based intelligent key code identification running on the device 10.

The device 10 may be a separate terminal or modules of the terminal. Additionally, the sequence extraction unit 100, the vectorization unit 200, the learning unit 300, the classification unit 400 and the identification unit 500 may be formed as an integrated module or at least one module. However, to the contrary, each element may be formed as a separate module.

The device 10 may be mobile or fixed. The device 10 may be in the form of a server or an engine, and may be interchangeably used with a device, an apparatus, a terminal, user equipment (UE), a mobile station (MS), a wireless device and a handheld device.

The device 10 may execute or create a variety of software based on an Operation System (OS), namely, a system. The OS is a system program for enabling software to use the hardware of the device, and may include mobile computer OS including Android OS, iOS, Windows Mobile OS, Bada OS, Symbian OS and Blackberry OS and computer OS including Windows family, Linux family, Unix family, MAC, AIX, and HP-UX.

The sequence extraction unit 100 extracts Smali code sequence by decompiling the application. The sequence extraction unit 100 extracts Smali (An Assembler/Disassembler for Android's dex format) code by decompiling the application for each category of the application. The Smali code contains the details and functions of the application. Subsequently, the Smali code is converted to Smali code sequence to identify the sequence of execution.

Figure 2:
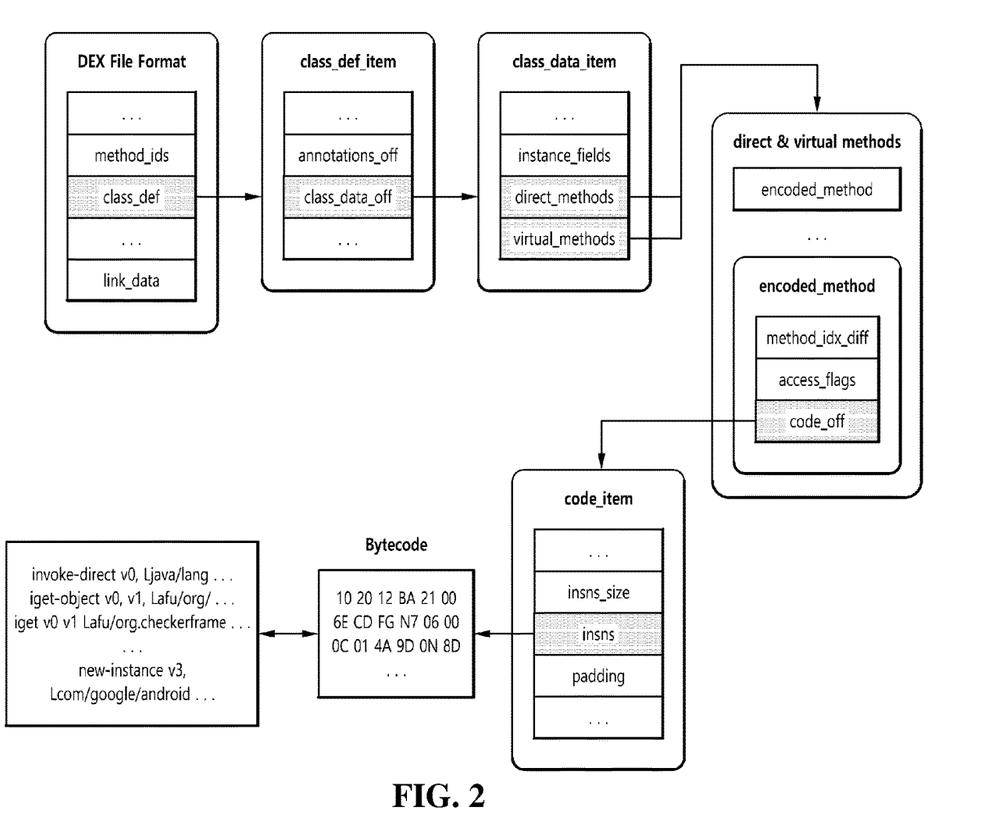
FIG. 2 is a diagram illustrating a Smali code sequence extraction process of a sequence extraction unit of FIG. 1.

Referring to FIG. 2, a detailed process of extracting Smali code is as follows. When APK is decompiled, there are Signature, AndroidManifest.xml, Resources, classes.dex in Android package. Among them, classes.dex file may be extracted. The extracted DEX file has 9 fields, header, string_ids, type_ids, proto_ids, field_ids, method_ids, class_def, data, link_data.

Here, class_def_item field has class.def field class information, and class_data_off field in class_def_item points to class_data_item. Class_data_item has method information and is composed of encoded_method which locates code_item using code_off field inside, and actual bytecodes are present in insns field.

The extracted bytecode is converted to Smali code to allow human to read it. The code sequence is extracted using the converted Smali code.

As an embodiment, Smali code sequence may be extracted using an APK analysis tool, Androguard. Using APK as input of Androguard, classes.dex file is extracted, method is extracted to return bytecode, and the byte code is converted to Smali code. An example of each of the extracted Smali code and Smali code sequence is as shown in the following Table 1.

TABLE 1

| Smali Code |
| --- |
| invoke_ Ljava/lang/Object;-><init>( )V return_ move_ invoke_ Landroid/arch/core/executor/ArchTaskExecutor;->postToMainThread(Ljava/lang/Runnable;)V return_ move_ invoke_ Landroid/arch/core/executor/ArchTaskExecutor;->executeOnDiskIO(Ljava/lang/Runnable;)V return_const_ "9" new_ "[I" fill_ sput_ Landroid/support/a/a/a;->a[I const_ "8" new_ "[I" fill_ sput_ Landroid/support/a/a/a;->b[I const_ "13" new_ "I" fill_ sput_ Landroid/support/a/a/a;->c[I const_ "2" new_ "[I" fill_ sput_ Landroid/support/a/a/a;->d[I const_ "1" new_ "[I" const_ "0" constv3 "16843161" aputv3 sput_ Landroid/support/a/a/a;->e[I new_ "[I" fill_ sput_ Landroid/support/a/a/a;->f[I return_ fill_ (x03, x00, x01, x01, x21, x01, x01, x01, x55, x01, x01, x01, x59, x01, x01, x01, x1f, x03, x01, x01, xea, x03, x01, x01, xfb, x03, x01, x01, x02, x04, x01, x01, x03, x04, x01, x01) fill_ (x03, x00, x01, x01, xb5, x01, x01, x01, xb6, x01, x01, x01, x24, x03, x01, x01, x25, x03, x01, x01, x26, x03, x01, x01, x5a, x04, x01, x01, x5b, x04, x01, x01) fill_ (x03, x00, x01, x01, x04, x04, x01, x01, x05, x04, x01, x01, x06, x04, x01, x01, x07, x04, x01, x01, x08, x04, x01, x01, x09, x04, x01, x01, x0a, x04, x01, x01, x0b, x04, x01, x01, x0c, x04, x01, x01, x0d, x04, x01, x01, xcb, x04, x01, x01, xcc, x04, x01, x01) fill_ (x03, x00, x01, x01, x05, x04, x01, x01) fill_ (x03, x00, x01, x01, xcd, x01, x01, x01) iput_ Landroid/support/a/a/b$1;->aLandroid/support/a/a/b; invoke_ Ljava/lang/Object;-><init>( )V return_ iget_ Landroid/support/a/a/b$1;->aLandroid/support/a/a/b; invoke_ Landroid/support/a/a/b;->invalidateSelf( )V return_ ... |

TABLE 2

| Small Code Sequence |
| --- |
| 'igetv0, v1, Lafu/org/checkerframework/checker/formatter/FormatUtil$ExcessiveOrMissingFormatArgumentException;->expectedI', 'returnv0' 'invoke-directv0, Ljava/lang/Object;-><init>( )V', 'return-void' 'invoke-directv0, Ljava/lang/Exception;-><init>( )V', 'iput-objectv1, v0, Lafu/org/checkerframework/checker/regex/RegexUtil$CheckedPatternSyntaxException;->pseLjava/util/regex/PatternSyntaxException;', 'return-void' 'invoke-staticv2, Ljava/util/regex/Pattern;->compile(Ljava/lang/String;)Ljava/util/regex/Pattern;', 'move-result-objectv0', 'invoke-staticv0, Lafu/org/checkerframework/checker/regex/RegexUtil;->getGroupCount(Ljava/util/regex/Pattern;)I', 'move-resultv0', 'if-gev0, v3, +00dh', 'new-instancev1, Ljava/util/regex/PatternSyntaxException;', 'invoke-staticv2, v3, v0, Lafu/org/checkerframework/checker/regex/RegexUtil;->regexErrorMessage(Ljava/lang/String;II)Ljava/lang/String;','move-result-objectv3','const/4v0, -1', 'invoke-directv1, v3, v2, v0, Ljava/util/regex/PatternSyntaxException;-><init>(Ljava/lang/String;Ljava/lang/String;I)V', 'return-objectv1', 'const/4v2, 0', 'return-objectv2', 'move-exceptionv2', 'return-objectv2' 'const/4v0, 0', 'invoke-staticv1, v0, Lafu/plume/RegexUtil;->isRegex(Ljava/lang/String;I)Z', 'move-resultv1', 'returnv1' 'const-stringv0, "%(\\d+\\$)?([-#+0, (\\<]*)?(\\d+)?(\\.\\d+)?([tT])?([a-zA-Z%])"', 'invoke-staticv0, Ljava/util/regex/Pattern;->compile(Ljava/lang/String;)Ljava/util/regex/Pattern;', 'move-result-objectv0', 'sput-objectv0, Lafu/org/checkerframework/checker/formatter/FormatUtil;->fsPatternLjava/util/regex/Pattern;', 'return-void'] ['invoke-directv0, Ljava/lang/Object;-><init>( )V', 'return-void' |

Figure 3:
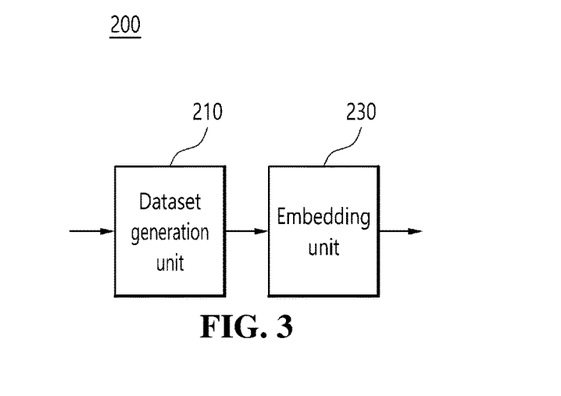
FIG. 3 is a block diagram of a vectorization unit of FIG. 1.

The vectorization unit 200 vectorizes the extracted Smali code sequence to construct a training dataset. Referring to FIG. 3, the vectorization unit 200 may include a dataset generation unit 210 and an embedding unit 230.

The vectorization unit 200 constructs the training dataset by pre-processing opcodes, parameters, strings, and memory address of all the extracted Smali code sequences. To construct the training dataset, the training dataset is generated by labeling for each application category of the extracted Smali code sequences.

As an embodiment, for a total of 300 applications, the training dataset may be built in 6 categories (music_and_audio, education, game, beauty, tools, weather) every 50 applications.

The embedding unit 230 vectorizes the training dataset for use as input of a deep learning model. Dictionarization is performed by converting the generated training dataset into numeric form. Subsequently, embedding is performed by converting the dictionarized Smali code sequences into dense vectors.

As an embodiment, 4,386,662 Smali code sequences may be incorporated into a dictionary and vectorized. An example of the resulting dictionary is as shown in the following Table.

TABLE 3

| No. | Smali code Sequence |
|---|---|
| 0 | invoke__ Ljava/lang/Object;-><init>( )V ... |
| 1 | move__ invoke__ Landroid/arch/core/executor ... |
| 2 | const__ "9" new__ "[I" fill__ sput__ Landroid/support ... |
| 3 | iput__ Landroid/support/a/a/b$1;->aLandroid ... |
| 4 | new__ Ljava/lang/ref/WeakReference; invoke__ ... |
| 5 | igetv__ Lafu/org/checkerframework/checker ... |
| ... | ... |
| 4386656 | iget__ Lcom/bumptech/glide/reques ... |
| 4386657 | check__ Landroid/graphics/drawable/Draw ... |
| 4386658 | invoke__ Lcom/google/android/gms/ ... |
| 4386659 | check__ Lcom/google/android/gms/common/... |
| 4386660 | invoke__ Landroidx/appcompat/app/AppC ... |
| 4386661 | new__ Lcom/google/android/material/ ... |

The learning unit 300 trains the deep learning model with the vectorized Smali code sequences to generate a classifier. In other words, the learning unit 300 inputs the vectorized training dataset to the deep learning model to generate a classifier, and trains a prediction model using a CNN deep learning algorithm.

As an embodiment, the number of Convolution Layers used in the prediction model is 4, and an activation function uses ReLu. Only a particular feature having a large value by Max pooling is used. The prediction model is trained with a total of 140,613,114 parameters by reducing the number of training weights using Gated Recurrent Unit (GRU). The model validation accuracy obtained by the trained prediction model is measured as 0.8361.

The classification unit 400 generates a category classification result using Smali code sequence of a target application as input of the classifier. The classification unit 400 may classify as a category having the highest probability among categories that will be classified for the target application.

After training the prediction model, Smali code sequence having the greatest influence in each category may be extracted using Local Interpretable Model-agnostic Explanations (LIME) which is a deep learning visualization technique in the model. An equation for calculating LIME is given as the following Equation 1.

$$\xi(x) = \underset{g \in G}{\operatorname{argmin}} \mathcal{L}(f, g, \pi_x) + \Omega(g) \quad [\text{Equation 1}]$$

$$= \underset{g \in G}{\operatorname{argmin}} \left[ \sum_{i=1}^{N} e^{-\frac{D(x,x_i)^2}{\sigma^2}} (f(z_i) - g((z')_i))^2 + \infty\mathbb{1}_{\|\beta\|_0 > K} \right]$$

Here, f is a complex prediction model, and g is a simple model used to locally compare.

X is data, and β is a coefficient in the model g term and defined as $\|\beta\|_0 = \Sigma_j |\beta_j|^0$.

For example, in a target APK, when Smali code is extracted, converted to training data, and used as input of the prediction model, in case where the prediction model classifies the target APK as music and audio, important Smali code represents that the target APK is classified as music and audio using LIME in the prediction model.

As an embodiment, important Smali code sequences for each category are as shown in the following Tables 4 to 6.

TABLE 4

| music_and_audio | game |
|---|---|
| sget__ Landroid/os/Build$VERSION;->SDK__IN TI const__ "21" if__ invoke__ Landroid/widget/ImageView;->setImage Matrix(Landroid/graphics/Matrix;)V goto__ sget__ Landroidx/transition/ImageViewUtils;->s AnimateTransformMethodLjava/lang/refl ect/Method; if__ const__ "1" new__ [Ljava/lang/Object; const__ "0" aput__ invoke__ Ljava/lang/reflect/Method;->invoke(Ljava /lang/Object;[Ljava/lang/Object;)Ljava/la ng/Object; goto__ move__ new__ Ljava/lang/RuntimeException; invoke__ Ljava/lang/reflect/InvocationTargetExcept ion;->getCause( )Ljava/lang/Throwable; move__ invoke__ Ljava/lang/RuntimeException;-><init>(Lj ava/lang/Throwable;)V throw__ return__ iget__ Landroidx/renderscript/RenderScript;->m Element__DOUBLE__3Landroidx/renderscr ipt/Element; if__ sget__ Landroidx/renderscript/Element$DataTyp e;->FLOAT__64Landroidx/renderscript/El ement$DataType; const__ "3" invoke__ Landroidx/renderscript/Element;->createV ector(Landroidx/renderscript/RenderScript ;Landroidx/renderscript/Element$DataTyp e;I)Landroidx/renderscript/Element; move__ iput__ Landroidx/renderscript/RenderScript;->m Element__DOUBLE__3Landroidx/renderscr ipt/Element; iget__ | invoke__ Lkotlin/random/Random$Default;-><init> ( )V return__ sget__ Landroid/os/Build$VERSION;->SDK__IN TI const__ "21" if__ invoke__ Landroid/widget/ImageView;->setImage Matrix(Landroid/graphics/Matrix;)V goto__ sget__ Landroidx/transition/ImageViewUtils;->s AnimateTransformMethodLjava/lang/refle ct/Method; if__ const__ "1" new__ [Ljava/lang/Object; const__ "0" aput__ invoke__ Ljava/lang/reflect/Method;->invoke(Ljava /lang/Object;[Ljava/lang/Object;)Ljava/lan g/Object; goto__ move__ new__ Ljava/lang/RuntimeException; invoke__ |

TABLE 4-continued

| music_and_audio | game |
|---|---|
| Landroidx/renderscript/RenderScript;->mElement_DOUBLE_3Landroidx/renderscript/Element; return_ | Ljava/lang/reflect/InvocationTargetException;->getCause( )Ljava/lang/Throwable; move_ invoke_ Ljava/lang/RuntimeException;-><init>(Ljava/lang/Throwable;)V throw_ return_ iget_ Landroidx/renderscript/RenderScript;->mElement_DOUBLE_3Landroidx/renderscript/Element; if_ sget_ Landroidx/renderscript/Element$DataType;->FLOAT_64Landroidx/renderscript/Element$DataType; const_ "3" invoke_ Landroidx/renderscript/Element;->createVector(Landroidx/renderscript/RenderScript;Landroidx/renderscript/Element$DataType;I)Landroidx/renderscript/Element; move_ iput_ Landroidx/renderscript/RenderScript;->mElement_DOUBLE_3Landroidx/renderscript/Element; iget_ Landroidx/renderscript/RenderScript;->mElement_DOUBLE_3Landroidx/renderscript/Element; return_ |
| invoke_ Ljava/lang/Object;-><init>( )V new_ Ljava/lang/ThreadLocal; invoke_ Ljava/lang/ThreadLocal;-><init>( )V iput_ Lbolts/BoltsExecutors$ImmediateExecutor;->executionDepthLjava/lang/ThreadLocal; return_ | |
| iget_ Lokhttp3/Cookie;->secureZ return_ | iget_ Landroidx/documentfile/provider/SingleDocumentFile;->mContextLandroid/content/Context; iget_ Landroidx/documentfile/provider/SingleDocumentFile;->mUriLandroid/net/Uri; invoke_ Landroidx/documentfile/provider/DocumentsContractApi19;->isDirectory(Landroid/content/Context;Landroid/net/Uri;)Z move_ return_ |
| invoke_ Landroidx/appcompat/app/AppCompatDelegateImpl;->ensureSubDecor( )V iget_ Landroidx/appcompat/app/AppCompatDelegateImpl;->mSubDecorLandroid/view/ViewGroup; constv1 "16908290" invoke_ Landroid/view/ViewGroup;->findViewById(I)Landroid/view/View; move_ check_ Landroid/view/ViewGroup; invoke_ Landroid/view/ViewGroup;->removeAllViews( )V iget_ Landroidx/appcompat/app/AppCompatDelegateImpl;->mContextLandroid/content/Context; invoke_ Landroid/view/LayoutInflater;->from(Landroid/content/Context;)Landroid/view/LayoutInflater; move_ invoke_ Landroid/view/LayoutInflater;->inflate(ILandroid/view/ViewGroup;)Landroid/view/View; iget_ Landroidx/appcompat/app/AppCompatDelegateImpl;->mAppCompatWindowCallbackLandroidx/appcompat/app/AppCompatDelegateImpl$AppCompatWindowCallback; invoke_ Landroidx/appcompat/app/AppCompatDelegateImpl$AppCompatWindowCallback;->getWrapped( )Landroid/view/Window$Callback; move_ invoke_ Landroid/view/Window$Callback;->onContentChanged( )V return_ | invoke_ Landroidx/appcompat/app/AppCompatDelegateImpl;->ensureSubDecor( )V iget_ Landroidx/appcompat/app/AppCompatDelegateImpl;->mSubDecorLandroid/view/ViewGroup; constv1 "16908290" invoke_ Landroid/view/ViewGroup;->findViewById(I)Landroid/view/View; move_ check_ Landroid/view/ViewGroup; invoke_ Landroid/view/ViewGroup;->removeAllViews( )V iget_ Landroidx/appcompat/app/AppCompatDelegateImpl;->mContextLandroid/content/Context; invoke_ Landroid/view/LayoutInflater;->from(Landroid/content/Context;)Landroid/view/LayoutInflater; move_ invoke_ Landroid/view/LayoutInflater;->inflate(ILandroid/view/ViewGroup;)Landroid/view/View; iget_ Landroidx/appcompat/app/AppCompatDelegateImpl;->mAppCompatWindowCallbackLandroidx/appcompat/app/AppCompatDelegateImpl$AppCompatWindowCallback; invoke_ Landroidx/appcompat/app/AppCompatDelegateImpl$AppCompatWindowCallback;->getWrapped( )Landroid/view/Window$Callback; move_ invoke_ Landroid/view/Window$Callback;->onContentChanged( )V return_ iget_ Landroidx/transition/Visibility$DisappearListener;->mSuppressLayoutZ if_ iget_ Landroidx/transition/Visibility$DisappearListener;->mLayoutSuppressedZ if_ iget_ Landroidx/transition/Visibility$DisappearListener;->mParentLandroid/view/ViewGroup; if_ iput_ |

TABLE 4-continued

| music_and_audio | game |
|---|---|
| | Landroidx/transition/Visibility$Disappear Listener;->mLayoutSuppressedZ invoke_ Landroidx/transition/ViewGroupUtils;->suppressLayout(Landroid/view/ViewGroup;Z)V return_ |

TABLE 5

| education | beauty |
|---|---|
| invoke_ Landroidx/loader/content/ModernAsyncTask;->isCancelled( )Z move_ if_ invoke_ Landroidx/loader/content/ModernAsyncTask;->onCancelled(Ljava/lang/Object;)V goto_ invoke_ Landroidx/loader/content/ModernAsyncTask;->onPostExecute(Ljava/lang/Object;)V sget_ Landroidx/loader/content/ModernAsyncTask$Status;->FINISHEDLandroidx/loader/content/ModernAsyncTask$Status; iput_ Landroidx/loader/content/ModernAsyncTask;->mStatusLandroidx/loader/content/ModemAsyncTask$Status; return_ | invoke_ Ljava/lang/Object;-><init>( )V new_ Ljava/lang/ThreadLocal; invoke_ Ljava/lang/ThreadLocal;-><init>( )V iput_ Lbolts/BoltsExecutors$ImmediateExecutor;->executionDepthLjava/lang/ThreadLocal; return_ |
| ('iput_ Lcom/airbnb/lottie/LottieDrawable;->performanceTrackingEnabledZ iget_ Lcom/airbnb/lottie/LottieDrawable;->compositionLcom/airbnb/lottie/LottieComposition; if_ invoke_ Lcom/airbnb/lottie/LottieComposition;->setPerformanceTrackingEnabled(Z)V return_ | iput_ Lcom/airbnb/lottie/LottieDrawable;->performanceTrackingEnabledZ iget_ Lcom/airbnb/lottie/LottieDrawable;->compositionLcom/airbnb/lottie/LottieComposition; if_ invoke_ Lcom/airbnb/lottie/LottieComposition;->setPerformanceTrackingEnabled(Z)V return_ |
| 'invoke_ Ljava/lang/Object;-><init>( )V new_ Ljava/lang/ThreadLocal; invoke_ Ljava/lang/ThreadLocal;-><init>( )V iput_ Lbolts/BoltsExecutors$ImmediateExecutor;->executionDepthLjava/lang/ThreadLocal; return_ | iget_ Lokhttp3/Cookie;->secureZ return_ |
| iget_ Lokhttp3/Cookie;->secureZ return_ | invoke_ Landroidx/appcompat/app/AppCompatDelegateImpl;->ensureSubDecor( )V iget_ Landroidx/appcompat/app/AppCompatDelegateImpl;->mSubDecorLandroid/view/ViewGroup; constv1 "16908290" invoke_ Landroid/view/ViewGroup;->findViewById(I)Landroid/view/View; move_ check_ Landroid/view/ViewGroup; invoke_ Landroid/view/ViewGroup;->removeAllViews( )V iget_ Landroidx/appcompat/app/AppCompatDelegateImpl;->mContextLandroid/content/Context; invoke_ Landroid/view/LayoutInflater;->from(Landroid/content/Context;)Landroid/view/LayoutInflater; move_ invoke_ Landroid/view/LayoutInflater;->inflate(ILandroid/view/ViewGroup;)Landroid/view/View; iget_ Landroidx/appcompat/app/AppCompatDelegateImpl;->mAppCompatWindowCallbackLandroidx/appcompat/app/AppCompatDelegateImpl$AppCompatWindowCallback; invoke_ Landroidx/appcompat/app/AppCompatDelegateImpl$AppCompatWindowCallback;->getWrapped( )Landroid/view/Window$Callback; move_ invoke_ Landroid/view/Window$Callback;->onContentChanged( )V return_ |
| const_ "0" move_ move_ move_ move_ move_ invoke_ invoke_ Lio/reactivex/Flowable;->window(JLjava/util/concurrent/TimeUnit;Lio/reactivex/Sc | iget_ Landroidx/renderscript/RenderScript;->mElement_DOUBLE_3Landroidx/renderscript/Element; if_ sget_ |

TABLE 5-continued

| education | beauty |
|---|---|
| heduler;JZ)Lio/reactivex/Flowable; move_ return_ | Landroidx/renderscript/Element$DataType;->FLOAT_64Landroidx/renderscript/Element$DataType; const_ "3" invoke_ Landroidx/renderscript/Element;->createVector(Landroidx/renderscript/RenderScript;Landroidx/renderscript/Element$DataType;I)Landroidx/renderscript/Element; move_ iput_ Landroidx/renderscript/RenderScript;->mElement_DOUBLE_3Landroidx/renderscript/Element; iget_ Landroidx/renderscript/RenderScript;->mElement_DOUBLE_3Landroidx/renderscript/Element; return_ |
| new_ Lio/reactivex/internal/operators/observable/ObservableFromPublisher; invoke_ Lio/reactivex/internal/operators/observable/ObservableFromPublisher;-><init>(Lorg/reactivestreams/Publisher;)V invoke_ Lio/reactivex/plugins/RxJavaPlugins;->onAssembly(Lio/reactivex/Observable;)Lio/reactivex/Observable; move_ return_ | |

TABLE 6

| weather | tools |
|---|---|
| invoke_ Landroidx/loader/content/ModernAsyncTask;->isCancelled( )Z move_ if_ invoke_ Landroidx/loader/content/ModernAsyncTask;->onCancelled(Ljava/lang/Object;)V goto_ invoke_ Landroidx/loader/content/ModernAsyncTask;->onPostExecute(Ljava/lang/Object;)V sget_ Landroidx/loader/content/ModernAsyncTask$Status;->FINISHEDLandroidx/loader/content/ModernAsyncTask$Status; iput_ Landroidx/loader/content/ModernAsyncTask;-mStatusLandroidx/loader/content/ModernAsyncTask$Status; return_ | ('sgetv0 Landroid/os/Build$VERSION;->SDK_INT I const_ "21" if_ invoke_ Landroid/widget/ImageView;->setImageMatrix(Landroid/graphics/Matrix;)V goto_ sget_ Landroidx/transition/ImageViewUtils;->sAnimateTransformMethodLjava/lang/reflect/Method; if_ const_ "1" new_ [Ljava/lang/Object; const_ "0" aput_ invoke_ Ljava/lang/reflect/Method;->invoke(Ljava/lang/Object;[Ljava/lang/Object;)Ljava/lang/Object; goto_ move_ new_ Ljava/lang/RuntimeException; invoke_ Ljava/lang/reflect/InvocationTargetException;->getCause( )Ljava/lang/Throwable; move_ invoke_ Ljava/lang/RuntimeException;-><init>(Ljava/lang/Throwable;)V throw_ return_ iget_ Landroidx/renderscript/RenderScript;->mElement_DOUBLE_3Landroidx/renderscript/Element; if_ sget_ Landroidx/renderscript/Element$DataType;->FLOAT_64Landroidx/renderscript/Element$DataType; const_ "3" invoke_ Landroidx/renderscript/Element;->createVector(Landroidx/renderscript/RenderScript;Landroidx/renderscript/Element$DataType;I)Landroidx/renderscript/Element; move_ iput_ Landroidx/renderscript/RenderScript;->mElement_DOUBLE_3Landroidx/renderscript/Element; iget_ Landroidx/renderscript/RenderScript;->mElement_DOUBLE_3Landroidx/renderscript/Element; return_ |
| sgetv0 Landroid/os/Build$VERSION;->SDK_INT I const_ "21" if_ invoke_ Landroid/widget/ImageView;->setImageMatrix(Landroid/graphics/Matrix;)V goto_ sget_ Landroidx/transition/ImageViewUtils;->sAnimateTransformMethodLjava/lang/reflect/Method; if_ const_ "1" new_ [Ljava/lang/Object; const_ "0" aput_ invoke_ Ljava/lang/reflect/Method;->invoke(Ljava/lang/Object;[Ljava/lang/Object;)Ljava/lang/Object; goto_ move_ new_ Ljava/lang/RuntimeException; invoke_ Ljava/lang/reflect/InvocationTargetException;->getCause( )Ljava/lang/Throwable; move_ invoke_ Ljava/lang/RuntimeException;-><init>(Ljava/lang/Throwable;)V throw_ return_ iget_ Landroidx/renderscript/RenderScript;->mElement_DOUBLE_3Landroidx/renderscript/Element; if_ sget_ Landroidx/renderscript/Element$DataType;->FLOAT_64Landroidx/renderscript/Element$DataType; const_ "3" invoke_ | iget_ Landroidx/documentfile/provider/SingleDocumentFile;->mContextLandroid/content/Context; iget_ Landroidx/documentfile/provider/SingleDocumentFile;->mUriLandroid/net/Uri; invoke_ |

TABLE 6-continued

| weather | tools |
|---|---|
| Landroidx/renderscript/Element;->createVector(Landroidx/renderscript/RenderScript;Landroidx/renderscript/Element$DataType;I)Landroidx/renderscript/Element; move_ iput_ Landroidx/renderscript/RenderScript;->mElement_DOUBLE_3Landroidx/renderscript/Element; iget_ Landroidx/renderscript/RenderScript;->mElement_DOUBLE_3Landroidx/renderscript/Element; return_ | Landroidx/documentfile/provider/DocumentsContractApi19;->isDirectory(Landroid/content/Context;Landroid/net/Uri;)Z move_ return_ |
| iget_ Lokhttp3/Cookie;->secureZ return_ | invoke_ Landroidx/appcompat/app/AppCompatDelegateImpl;->ensureSubDecor( )V iget_ Landroidx/appcompat/app/AppCompatDelegateImpl;->mSubDecorLandroid/view/ViewGroup; constv1 "16908290" invoke_ Landroid/view/ViewGroup;->findViewById(I)Landroid/view/View; move_ check_ Landroid/view/ViewGroup; invoke_ Landroid/view/ViewGroup;->removeAllViews( )V iget_ Landroidx/appcompat/app/AppCompatDelegateImpl;->mContextLandroid/content/Context; invoke_ Landroid/view/LayoutInflater;->from(Landroid/content/Context;)Landroid/view/LayoutInflater; move_ invoke_ Landroid/view/LayoutInflater;->inflate(ILandroid/view/ViewGroup;)Landroid/view/View; iget_ Landroidx/appcompat/app/AppCompatDelegateImpl;->mAppCompatWindowCallbackLandroidx/appcompat/app/AppCompatDelegateImpl$AppCompatWindowCallback; invoke_ Landroidx/appcompat/app/AppCompatDelegateImpl$AppCompatWindowCallback;->getWrapped( )Landroid/view/Window$Callback; move_ invoke_ Landroid/view/Window$Callback;->onContentChanged( )V return_ |
| invoke_ Landroidx/appcompat/app/AppCompatDelegateImpl;->ensureSubDecor( )V iget_ Landroidx/appcompat/app/AppCompatDelegateImpl;->mSubDecorLandroid/view/ViewGroup; constv1 "16908290" invoke_ Landroid/view/ViewGroup;->findViewById(I)Landroid/view/View; move_ check_ Landroid/view/ViewGroup; invoke_ Landroid/view/ViewGroup;->removeAllViews( )V iget_ Landroidx/appcompat/app/AppCompatDelegateImpl;->mContextLandroid/content/Context; invoke_ Landroid/view/LayoutInflater;->from(Landroid/content/Context;)Landroid/view/LayoutInflater; move_ invoke_ Landroid/view/LayoutInflater;->inflate(ILandroid/view/ViewGroup;)Landroid/view/View; iget_ Landroidx/appcompat/app/AppCompatDelegateImpl;->mAppCompatWindowCallbackLandroidx/appcompat/app/AppCompatDelegateImpl$AppCompatWindowCallback; invoke_ Landroidx/appcompat/app/AppCompatDelegateImpl$AppCompatWindowCallback;->getWrapped( )Landroid/view/Window$Callback; move_ invoke_ Landroid/view/Window$Callback;->onContentChanged( )V return_ > 3380905.00', 0.0001078366650393867) | iget_ Landroidx/transition/Visibility$DisappearListener;->mSuppressLayoutZ if_ iget_ Landroidx/transition/Visibility$DisappearListener;->mLayoutSuppressedZ if_ iget_ Landroidx/transition/Visibility$DisappearListener;->mParentLandroid/view/ViewGroup; if_ iput_ Landroidx/transition/Visibility$DisappearListener;->mLayoutSuppressedZ invoke_ Landroidx/transition/ViewGroupUtils;->suppressLayout(Landroid/view/ViewGroup;Z)V return_ |

The identification unit 500 identifies and provides important Smali code sequence from which the classification result of the target application is derived.

The identification unit 500 may include an important Smali code sequence identifier to output important Smali code sequences having a greatest influence when the classification unit 400 derives the result.

Accordingly, when the target application belongs to a category, the important Smali code sequences of the target application in the category are outputted.

As an embodiment, when the target application is classified as music_and_audio category, the important Smali code sequences are outputted as below.

---

"sget_ Landroid/os/Build$VERSION;->SDK_INTI const_ "21" if_ invoke_ Landroid/widget/ImageView;->setImageMatrix(Landroid/graphics/Matrix;)V goto_sget_ Landroidx/transition/ImageViewUtils;->sAnimateTransformMethodLjava/lang/reflect/Method; if_ const_ "1" new_ [Ljava/lang/Object; const_ "0" aput_ invoke_Ljava/lang/reflect/Method;->invoke(Ljava/lang/Object;[Ljava/lang/Object;)Ljava/lang/Object; goto_ move_ new_ Ljava/lang/RuntimeException; invoke_Ljava/lang/reflect/InvocationTargetException;->getCause( )Ljava/lang/Throwable;move_ invoke_ Ljava/lang/RuntimeException;-><init>(Ljava/lang/Throwable;)Vthrow_ return_"

...

"invoke_ Landroidx/appcompat/app/AppCompatDelegateImpl;->ensureSubDecor( )Viget_ Landroidx/appcompat/app/AppCompatDelegateImpl;->mSubDecorLandroid/view/ViewGroup; constv1 "16908290" invoke_ Landroid/view/ViewGroup;->findViewById(I)Landroid/view/View; move_ check_ Landroid/view/ViewGroup; invoke_ Landroid/view/ViewGroup;->removeAllViews( )V iget_ Landroidx/appcompat/app/AppCompatDelegateImpl;->mContextLandroid/content/Context; invoke_ Landroid/view/LayoutInflater;->from(Landroid/content/Context;)Landroid/view/LayoutInflater; move_ invoke_ Landroid/view/LayoutInflater;->inflate(ILandroid/view/ViewGroup;)Landroid/view/View; iget_ Landroidx/appcompat/app/AppCompatDelegateImpl;->mAppCompatWindowCallback Landroidx/appcompat/app/AppCompatDelegateImpl$AppCompatWindowCallback; invoke_ Landroidx/appcompat/app/AppCompatDelegateImpl$AppCompatWindowCallback;->getWrapped( )Landroid/view/Window$Callback; move_ invoke_ Landroid/view/Window$Callback;->onContentChanged( )V return_ "

---

The output important Smali code sequences may be used to check if the APK file was properly classified and identify the code to be protected from attackers, to provide and make use of a list to which the protection technique is to be applied.

Figure 4:
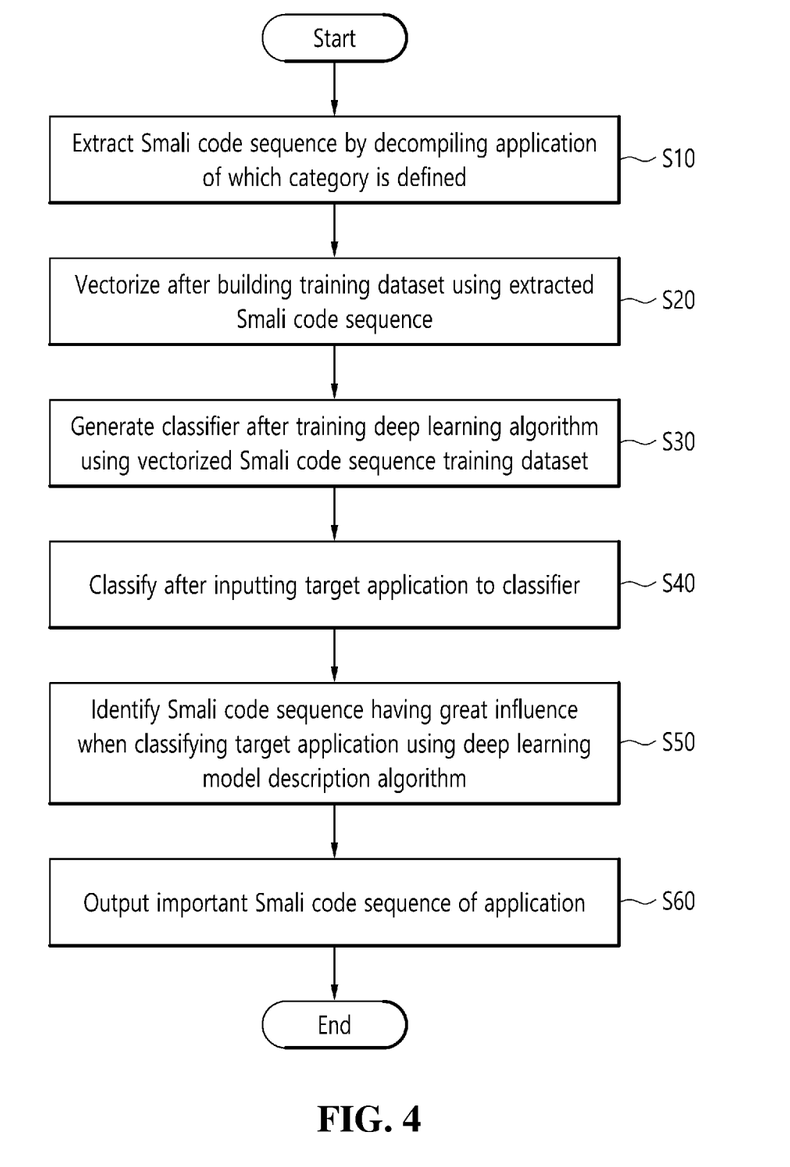
FIG. 4 is a flowchart of a code sequence based intelligent key code identification method according to an embodiment of the present disclosure.

FIG. 4 is a flowchart of a code sequence based intelligent key code identification method according to an embodiment of the present disclosure.

The code sequence based intelligent key code identification method according to this embodiment may be performed substantially in the same configuration as the device 10 of FIG. 1. Accordingly, the same reference sign is given to the same element as the device 10 of FIG. 1, and repetitious descriptions are omitted herein.

Additionally, the code sequence based intelligent key code identification method according to this embodiment may be performed by software (application) for performing code sequence based intelligent key code identification.

The present disclosure evaluates an application by identifying important Smali code sequence of the application based on Smali code of the application. Since Smali code is based on source code of the application being actually run, when Smali code sequence converted from Smali code is used, the actual execution flow of the application is reflected, which makes it possible to objectively evaluate the application.

Referring to FIG. 4, the code sequence based intelligent key code identification method according to this embodiment includes the step of extracting Smali code sequence by decompiling an application (S10). In the step of extracting the Smali code sequence, Smali code is extracted by decompiling the application for each category, and converted to Smali code sequence.

The extracted Smali code sequence is vectorized to construct a training dataset (S20). In the step of constructing the training dataset, the training dataset is built using all the extracted Smali code sequences, and to use as input of a deep learning model, the training dataset is vectorized.

The deep learning model is trained with the vectorized Smali code sequences to generate a classifier (S30).

A category classification result is generated using Smali code sequence of a target application as input of the classifier (S40). The step of generating the category classification result may include classifying as a category having the highest probability among categories that will be classified for the target application.

Important Smali code sequence is identified and provided, the important Smali code sequence from which the classification result of the target application is derived (S50). In the step of identifying and providing the important Smali code sequence, Local Interpretable Model-Agnostic Explanation (LIME), which is an algorithm that provides description of the deep learning model, may be used.

The important Smali code sequences having a greatest influence when deriving the result of the Smali code sequence are outputted (S60). Accordingly, in a category to which the target application belongs, the important Smali code sequences of the target application are outputted.

According to the code sequence based intelligent key code identification method, since Smali code based on source code of the application being actually run is extracted and converted to Smali code sequence, the actual execution flow of the application is identified, and the important Smali code sequence of the application is identified along with classifying the category of the application using the deep learning model. Accordingly, security is strengthened by identifying the important Smali code sequence based on the actual execution, so it is expected to prevent damage caused by malicious behavior.

The code sequence based intelligent key code identification method may be implemented in the form of applications or program instructions that can be executed through a variety of computer components, and recorded in computer-readable recording media. The computer-readable recording media may include program instructions, data files and data structures, alone or in combination.

The program instructions recorded in the computer-readable recording media may be specially designed and configured for the present disclosure and may be those known and available to persons having ordinary skill in the field of computer software.

Examples of the computer-readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM, and flash memory.

Examples of the program instructions include machine code generated by a compiler as well as high-level language code that can be executed by a computer using an interpreter. The hardware device may be configured to act as one or more software modules to perform the processing according to the present disclosure, and vice versa.

While the present disclosure has been hereinabove described with reference to the embodiments, those skilled in the art will understand that various modifications and changes may be made thereto without departing from the spirit and scope of the present disclosure defined in the appended claims.

INDUSTRIAL APPLICABILITY

The present disclosure evaluates an application by identifying important Smali code sequence of the application based on Smali code sequence of the application. Since Smali code is based on source code of the application being actually run, when Smali code sequence converted using Smali code is used, the actual execution flow of the application is reflected well, which makes it possible to objectively evaluate the application.

Accordingly, it can be used as a mobile application key code detection tool for identifying key code through code analysis of mobile applications, thereby preventing damage caused by malicious behavior.

DETAILED DESCRIPTION OF MAIN ELEMENTS

10: Code sequence based intelligent key code identification device
100: Sequence extraction unit
200: Vectorization unit
300: Learning unit
400: Classification unit
500: Identification unit

The invention claimed is:

1. A code sequence based intelligent key code identification method, comprising:
extracting Smali code sequences by decompiling a plurality of applications;
constructing a training dataset by vectorizing the extracted Smali code sequences into a vectorized Smali code sequences:
training a deep learning model with the vectorized Smali code sequences to generate a classifier;
generating a category classification result using Smali code sequences of a target application as input of the classifier; and
identifying and providing a Smali code sequence from which the category classification result of the target application is derived.

2. The method according to claim 1, wherein the constructing the training dataset comprises:
constructing the training dataset using all the extracted Smali code sequences; and
vectorizing the training dataset to use as input of the deep learning model.

3. The method of claim 1, wherein the extracting the Smali code sequences comprises:
extracting Smali code by decompiling the plurality of applications for each category; and
converting the Smali code to the Smali code sequences.

4. The method of claim 1, wherein the generating the category classification result comprises classifying the target application as a category having a highest probability among categories that will be classified for the target application.

5. The method of claim 1, wherein the identifying and providing the Smali code sequence uses Local Interpretable Model-Agnostic Explanation (LIME) which is an algorithm that provides description of the deep learning model.

6. A non-transitory computer-readable storage medium having recorded thereon a computer program for performing a code sequence based intelligent key code identification method, the method comprising:
extracting Smali code sequences by decompiling a plurality of applications;
constructing a training dataset by vectorizing the extracted Smali code sequences into a vectorized Smali code sequences;
training a deep learning model with the vectorized Smali code sequences to generate a classifier;
generating a category classification result using Smali code sequences of a target application as input of the classifier; and
identifying and providing a Smali code sequence from which the category classification result of the target application is derived.

7. A code sequence based intelligent key code identification device, comprising:
at least one hardware processor:
a not-transitory computer-readable storage medium storing instructions which, when executed by the at least one hardware processor, are configured to perform operations comprising,
extracting Smali code sequences by decompiling a plurality of applications;
constructing a training dataset by vectorizing the extracted Smali code sequences into a vectorized Smali code sequences;
training a deep learning model with the vectorized Smali code sequences to generate a classifier;
generating a category classification result using Smali code sequences of a target application as input of the classifier; and
identifying and providing a Smali code sequence from which the category classification result of the target application is derived.

8. The device of claim 7, wherein the operations further comprise:
constructing the training dataset using all the extracted Smali code sequences; and vectorizing the training dataset to use as input of the deep learning model.

9. The device of claim 7, wherein the operations further comprise:
extracting Smali code by decompiling the plurality of applications for each category; and
converting the Smali code to the Smali code sequences.

10. The device of claim 7, wherein the classification unit classifies the target application as a category having a highest probability among categories that will be classified for the target application.

11. The device of claim 7, wherein the identification unit uses Local Interpretable Model-Agnostic Explanation (LIME) which is an algorithm that provides description of the deep learning model.

* * * * *